US012725128B2

(12) United States Patent
Barbitta et al.

(10) Patent No.: US 12,725,128 B2
(45) Date of Patent: Sep. 1, 2026

(54) SYSTEMS AND METHODS FOR DETECTING REAL-TIME ISSUES IN GUEST-HOST MESSAGES USING MACHINE LEARNING MODELS

(71) Applicant: Airbnb, Inc., San Francisco, CA (US)

(72) Inventors: Zachary Barbitta, Seattle, WA (US); Morris Chuang, Seattle, WA (US); Ying Lyu, Santa Clara, CA (US); Cen Mia Zhao, Foster City, CA (US); Lianghao Li, Los Altos, CA (US); Cheng Wan, Kirkland, WA (US); Brian Wang, Woodinville, WA (US); Jordan Yeager, Hood River, OR (US); Zhu Xiong, Mercer Island, WA (US); Ying Zhang, Palo Alto, CA (US); Yinglu Shao, Centreville, VA (US); Shuqi Sun, Sunnyvale, CA (US)

(73) Assignee: Airbnb, Inc., San Francisco, CA (US)

( * ) Notice: Subject to any disclaimer, the term of this patent is extended or adjusted under 35 U.S.C. 154(b) by 227 days.

(21) Appl. No.: 18/634,549

(22) Filed: Apr. 12, 2024

(65) Prior Publication Data

US 2024/0346454 A1 Oct. 17, 2024

Related U.S. Application Data

(60) Provisional application No. 63/496,013, filed on Apr. 13, 2023.

(51) Int. Cl.
*G06Q 10/107* (2023.01)
*G06F 40/279* (2020.01)

(52) U.S. Cl.
CPC ......... *G06Q 10/107* (2013.01); *G06F 40/279* (2020.01)

(58) Field of Classification Search
CPC ..... G06Q 10/107; G06F 40/279; G06F 40/30; G06F 40/35
See application file for complete search history.

(56) References Cited

U.S. PATENT DOCUMENTS

| | | | | |
|---|---|---|---|---|
| 10,121,203 | B2 * | 11/2018 | Christensen | G06Q 30/0266 |
| 10,142,266 | B2 * | 11/2018 | Liu | H04L 51/046 |
| 10,158,593 | B2 * | 12/2018 | Pfriem | G06Q 10/107 |
| 10,498,673 | B2 * | 12/2019 | Zhang | H04L 67/75 |
| 10,958,599 | B1 * | 3/2021 | Penov | G06Q 10/00 |
| 11,032,231 | B1 * | 6/2021 | Jeon | H04L 51/216 |

(Continued)

*Primary Examiner* — Kenny Nguyen
(74) *Attorney, Agent, or Firm* — McDermott Will & Schulte LLP

(57) ABSTRACT

There is provided a method that is performed while a host and a guest are using a conversational messaging interface. For a message thread, in response to receiving a guest message, the method computes a probability for guest issues by inputting feature vectors from the guest message to a guest issue detection model. In response to receiving a host message, the message computes a probability for host issues by inputting feature vectors from the host message to a host issue detection model. If the message thread includes particular keywords, and if the probability for the guest issues is above a guest issue predetermined threshold, the method includes providing alerts that is visible only to the guest. If the probability for the host issues is above a host issue predetermined threshold, the method also includes providing alerts that is visible only to the host.

20 Claims, 11 Drawing Sheets

(56) References Cited

U.S. PATENT DOCUMENTS

| | | | | |
|---|---|---|---|---|
| 11,190,469 | B2 * | 11/2021 | Erhart | H04L 51/046 |
| 11,720,612 | B2 * | 8/2023 | Harijan | H04L 51/046 707/725 |
| 11,943,188 | B1 * | 3/2024 | Rathi | G06Q 10/107 |
| 12,131,334 | B2 * | 10/2024 | Werdell | G06Q 10/06398 |
| 12,225,158 | B2 * | 2/2025 | Tzur | G10L 15/1815 |
| 12,316,807 | B2 * | 5/2025 | Kuppulal | H04M 3/5175 |
| 2013/0055113 | A1 * | 2/2013 | Chazin | H04L 12/1822 715/758 |
| 2017/0300537 | A1 * | 10/2017 | Kim | G06F 16/248 |
| 2020/0036831 | A1 * | 1/2020 | Kim | G06F 3/0481 |
| 2020/0356587 | A1 * | 11/2020 | Harijan | H04L 51/216 |
| 2021/0029065 | A1 * | 1/2021 | Erhart | H04L 51/02 |
| 2022/0129905 | A1 * | 4/2022 | Sethumadhavan | G06N 3/006 |
| 2023/0011434 | A1 * | 1/2023 | Werdell | G06Q 30/016 |
| 2024/0202546 | A1 * | 6/2024 | Klein | G06N 5/022 |
| 2024/0205332 | A1 * | 6/2024 | Tzur | H04M 3/5166 |
| 2024/0220704 | A1 * | 7/2024 | Yan | G06F 40/106 |
| 2025/0080654 | A1 * | 3/2025 | Kuppulal | H04M 3/5175 |

* cited by examiner

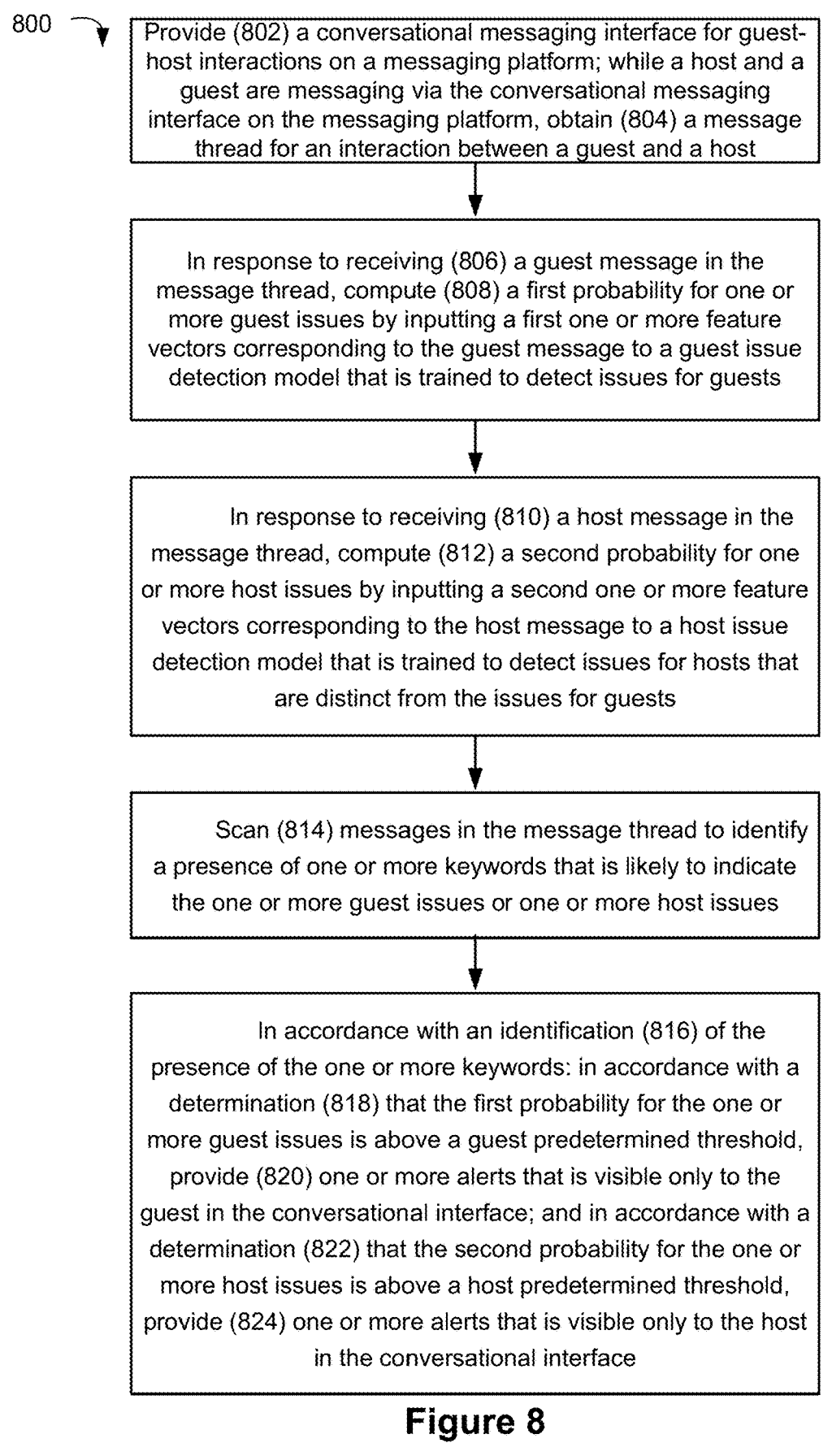

800

Provide (802) a conversational messaging interface for guest-host interactions on a messaging platform; while a host and a guest are messaging via the conversational messaging interface on the messaging platform, obtain (804) a message thread for an interaction between a guest and a host In response to receiving (806) a guest message in the message thread, compute (808) a first probability for one or more guest issues by inputting a first one or more feature vectors corresponding to the guest message to a guest issue detection model that is trained to detect issues for guests In response to receiving (810) a host message in the message thread, compute (812) a second probability for one or more host issues by inputting a second one or more feature vectors corresponding to the host message to a host issue detection model that is trained to detect issues for hosts that are distinct from the issues for guests Scan (814) messages in the message thread to identify a presence of one or more keywords that is likely to indicate the one or more guest issues or one or more host issues In accordance with an identification (816) of the presence of the one or more keywords: in accordance with a determination (818) that the first probability for the one or more guest issues is above a guest predetermined threshold, provide (820) one or more alerts that is visible only to the guest in the conversational interface; and in accordance with a determination (822) that the second probability for the one or more host issues is above a host predetermined threshold, provide (824) one or more alerts that is visible only to the host in the conversational interface

Figure 8

SYSTEMS AND METHODS FOR DETECTING REAL-TIME ISSUES IN GUEST-HOST MESSAGES USING MACHINE LEARNING MODELS

PRIORITY CLAIM AND RELATED APPLICATION

The application claims the benefit of U.S. Provisional Application No. 63/496,013, filed Apr. 13, 2023, the content of which is incorporated herein in its entirety.

TECHNICAL FIELD

This application relates generally to special-purpose machines that manage conversational messaging interfaces and data processing and improvements to such variants, and to the technologies by which such special-purpose machines become improved compared to other special-purpose machines for detecting real-time issues in guest-host interactions using machine learning models.

BACKGROUND

Web or cloud-based systems may help users perform a variety of tasks, a common one being e-commerce websites that permit users to buy, book, or reserve products and/or services. Typically, the customer user of such a site performs such tasks (e.g., purchasing, booking) themselves, using the website as a tool for facilitating the transaction. After a customer purchases or books a product or a service, the customer may want to interact with the seller or the owner of that product or service. For example, a host may post a property listing in an online marketplace and a guest may book that property. Following that initial purchase or agreement to book, the guest and the host may use a conversational messaging interface for updates or alerts, or for informational purposes. Sometimes, the guest may send the host a message that indicates a real-time issue (e.g., "I can't get into the listing"). Conversely, the host may send the guest a message that indicates another issue (e.g., I need you to leave the listing"). Conventional marketplaces either do not provide conversational messaging interfaces for information exchange between parties or lack sophistication in handling messages. For example, some real-time issue handling may not scale with number of messages or users. Different types of users may have different needs for alerts. Accuracy is important when handling messages and generating responses. Providing inaccurate intercepts or responses may annoy users and turn them away from the platform.

SUMMARY

Technical solutions for more personalized, dynamic, accurate, and timely analysis of messages and generation of alerts and/or responses are therefore generally desired.

Accordingly, some implementations include one or more machine learning models that scan guest and/or host message threads for potential issues. When the message thread contains a word that is on an issues keyword list (e.g. "TV remote," "agreement," "checkout instructions," etc.) and/or when the model identifies a potential issue, the system may follow up with the guest and/or host to check if they have a concern. If a user confirms that they have a concern, the user may automatically enter an issues triage flow. The user may be provided an option of connecting with local services or a member of a team.

The disclosed implementations provide a method of detecting real-time issues in guest-host messages. The method includes, while a host and a guest are using a conversational messaging interface, obtaining a message thread for an interaction between the guest and the host. The method also includes, in response to receiving a guest message in the message thread, computing a first probability for one or more guest issues by inputting a first one or more feature vectors corresponding to the guest message to a guest issue detection model that is trained to detect issues for guests. The method also includes, in response to receiving a host message in the message thread, computing a second probability for one or more host issues by inputting a second one or more feature vectors corresponding to the host message to a host issue detection model that is trained to detect issues for hosts that are distinct from the issues for guests. The method also includes scanning messages in the message thread to identify a presence of one or more keywords that is likely to indicate the one or more guest issues or one or more host issues. The method further includes, in accordance with an identification of the presence of the one or more keywords: in accordance with a determination that the first probability for the one or more guest issues is above a guest issue predetermined threshold, providing one or more alerts that is visible only to the guest in the conversational messaging interface; and in accordance with a determination that the second probability for the one or more host issues is above a host predetermined threshold, providing one or more alerts that is visible only to the host in the conversational messaging interface.

In some embodiments, scanning the messages in the message thread is performed in accordance with the determination that either the first probability is above the guest issue predetermined threshold or the second probability is above the host issue predetermined threshold.

In some embodiments, (i) computing the first probability for the one or more guest issues and (ii) computing the second probability for the one or more host issues, are performed in accordance with an identification of the presence of the one or more keywords.

In some embodiments, the guest issue predetermined threshold is different from the host issue predetermined threshold.

In some embodiments, the guest issue predetermined threshold is same as the host issue predetermined threshold.

In some embodiments, the guest issue detection model and the host issue detection model operate concurrently on a same set of feature vectors corresponding to messages from the message thread.

In some embodiments, the guest issue detection model and the host issue detection model operate independently on subsets of a same set of feature vectors corresponding to messages from the message thread.

In some embodiments, the guest issue detection model and the host issue detection model are dependent on each other's output.

In some embodiments, the guest issue detection model is a pre-trained model that is (i) trained on guest-to-host messages and (ii) uses guest-to-host messages to do its detection; and the host issue detection model is another pre-trained model that is (i) trained on host-to-guest messages and (ii) uses host-to-guest messages to do its detection.

In some embodiments, the guest issue detection model and the host issue detection model are binary text classification machine learning models.

In some embodiments, the method further includes continuously training the guest issue detection model and the host issue detection model using messages from the message thread.

In some embodiments, the one or more keywords include keywords from a plurality of languages.

In some embodiments, (i) the guest issue detection model is trained to detect issues for guests based on a first language and (ii) the host issue detection model is trained to detect issues for hosts based on a second language distinct from the first language.

In some embodiments, the guest issue detection model and the host issue detection model use different thresholds for detecting issues.

In another aspect, an electronic device includes one or more processors, memory, a display, and one or more programs stored in the memory. The programs are configured for execution by the one or more processors and are configured to perform any of the methods described herein.

In another aspect, a non-transitory computer readable storage medium stores one or more programs configured for execution by a computing device having one or more processors, memory, and a display. The one or more programs are configured to perform any of the methods described herein.

Thus methods, systems, and graphical user interfaces are disclosed that provide messages in response to detecting issues in messages exchanged between hosts and guests.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 8 shows a flow diagram of a method for detecting issues in guest-host messages, according to some embodiments.

DETAILED DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Many modifications and variations of this disclosure can be made without departing from its spirit and scope, as will be apparent to those skilled in the art. The specific implementations described herein are offered by way of example only, and the disclosure is to be limited only by the terms of the appended claims, along with the full scope of equivalents to which such claims are entitled.

Figure 1:
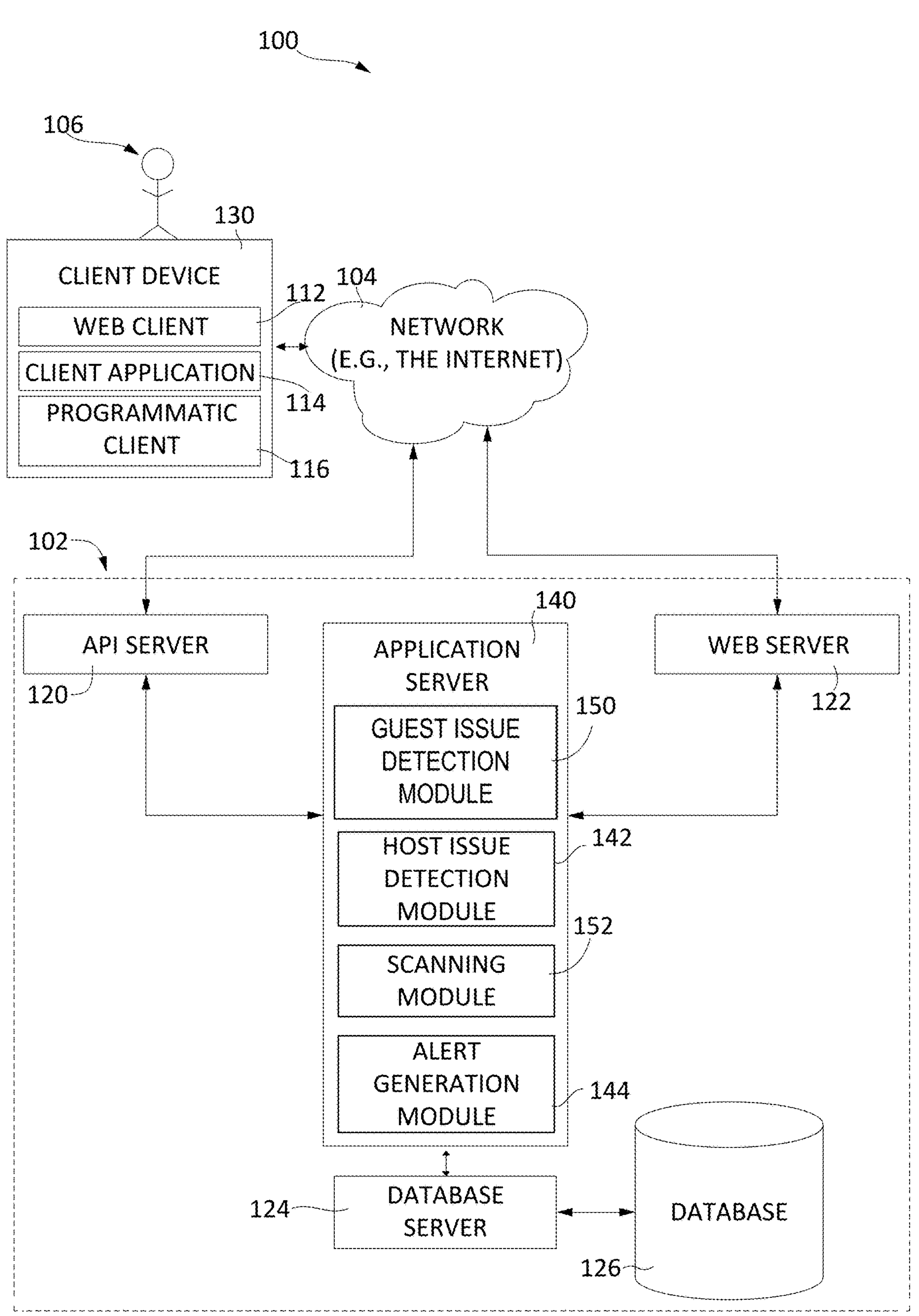
FIG. 1 is a block diagram illustrating an exemplary issue detection system implemented in a networked environment, in accordance with some embodiments.

FIG. 1 shows a block diagram of a network architecture 100 for an optimized search system according to some embodiments. FIG. 1 illustrates, for example, a web client 112 (e.g., a browser), client application(s) 114, and a programmatic client 116 executing on a client device 130. The client device 130 includes a web client 112, client application(s) 114, and a programmatic client 116 alone, together, or in any suitable combination. Although FIG. 1 shows one client device 130, in some embodiments, the network architecture 100 comprises multiple client devices.

In some embodiments, the client device 130 comprises a computing device that includes at least a display and communication capabilities that provide access to a networked system 102 via a network 104. The client device 130 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultra-book, netbook, laptop, desktop, multi-processor system, microprocessor-based or programmable consumer electronic, game consoles, set-top box (STB), network personal computer (PC), mini-computer, and so forth. In some embodiments, the client device 130 comprises one or more of a touch screens, accelerometer, gyroscope, biometric sensor, camera, microphone, Global Positioning System (GPS) device, and the like.

The client device 130 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In some embodiments, the client device 130 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, e-commerce site apps (also referred to as "marketplace apps"), and reservation applications for temporary stays at hotels, motels, or residences managed by other end-users (e.g., a posting end-user who owns a home and lists the entire home or private room). In some embodiments, the client application(s) 114 include various components operable to present information to the user and communicate with the networked system 102. In some embodiments, if an e-commerce site application is included in the client device 130, then this application is configured to locally provide the user interface and at least some of the functionalities with the application configured to communicate with the networked system 102, on an as-needed basis, for data or processing capabilities not locally available (e.g., access to a database of items available for sale, to authenticate a user, to verify a method of payment). Conversely, if the e-commerce site application is not included in the client device 130, the client device 130 can use its web browser to access the e-commerce site (or a variant thereof) hosted on the networked system 102.

The web client 112 accesses the various systems of the networked system 102 via the web interface supported by a web server 122. Similarly, the programmatic client 116 and client application(s) 114 accesses the various services and functions provided by the networked system 102 via a programmatic interface provided by an Application Program Interface (API) server 120.

Users (e.g., user 106) comprise a person, a machine, or other means of interacting with the client device 130. In some embodiments, the user 106 is not part of the network architecture 100, but interacts with the network architecture 100 via the client device 130 or another means. For instance, the user 106 provides input (e.g., touch screen input or alphanumeric input) to the client device 130 and the input is communicated to the networked system 102 via the network 104. In this instance, the networked system 102, in response to receiving the input from the user 106, communicates information to the client device 130 via the network 104 to be presented to the user 106. In this way, the user 106 can interact with the networked system 102 using the client device 130.

The API server 120 and the web server 122 are coupled to, and provide programmatic and web interfaces respectively to, one or more application server(s) 140. The application server 140 is configured to detect issues in response to a message from a client device 130. The client device 130 may be used by a guest or a host. The message may include a message in a message thread for a conversation between the guest and the host, using a conversational messaging interface. The application server(s) 140 include a guest issue detection module 150 to detect issues in a guest message, and may use a first one or more machine learning models trained to detect such issues. The application server(s) 140 also include a host issue detection module 142 to detect issues in a host message, and may use a second one or more machine learning models trained to detect such issues. Each model may be configured to detect issues in real-time messages in an optimized manner as compared to conventional techniques. The guest issue detection module 150 and the host issue detection module 142 may each include model parameters, hyperparameters, and/or feature vectors, for detecting issues. The feature vectors may include static word embedding, such as one-hot encoding, word2vec, glove, fastText, and/or dynamic (contextualized) word embedding, e.g., ELMo, BERT. The application server(s) 140 also include a scanning module 152 to scan messages to detect (or identify) a presence of predetermined keywords that may indicate issues. Such keywords may also be stored as part of the module. For example, a keyword list (e.g. "TVs," "remotes," "agreement," "check-out time," etc.) may be stored as part of the scanning module 152 and/or the database 126. The scanning module 152 may use rules to determine whether and how a message should be scanned. The application server(s) 140 also include an alert generation module 144 to generate alerts or responses when such issues are detected. In some embodiments, the alert generation module 144 generates one or more alerts when probability for one or more issues is above one or more predetermined thresholds. For example, when a probability of a guest issue exceeds a threshold (e.g., 0.9), an alert may be generated for a guest. Similarly, when a probability of host issue exceeds another threshold (e.g., 0.85), another alert may be generated for a host. The thresholds and/or the probabilities may be stored as part of the alert generation module 144, the guest issue detection module 150, and/or the host issue detection module 142. These modules may comprise one or more modules or applications and each of which can be embodied as hardware, software, firmware, or any combination thereof to facilitate optimizing the search results for the client device 130. The application server(s) 140 are, in turn, shown to be coupled to one or more database server(s) 124 that facilitate access to one or more information storage repositories or database(s) 126. In some embodiments, the database(s) 126 are storage devices that store information to be posted (e.g., inventory, image data, catalog data, feature vectors) to the guest issue detection module 142, the host issue detection module 142, the scanning module 152, and/or the alert generation module 144. The database(s) 126 also stores digital goods information in accordance with some embodiments. Operations of the modules are described below in reference to FIGS. 2-8, according to one or more embodiments.

While the network architecture 100 shown in FIG. 1 employs a client-server architecture, the present inventive subject matter is, of course, not limited to such an architecture, and can equally be implemented in a distributed, or peer-to-peer, architecture system, for example. The various components of the applications server(s) 140 (e.g., the guest issue detection module 142, the host issue detection module 142, the scanning module 152, and/or the alert generation module 144) may also be implemented as standalone software programs, which do not necessarily have networking capabilities.

Although the modules are shown in FIG. 1 as components of the networked system 102, it will be appreciated that, in alternative embodiments, each may be a component in a web service that is separate and distinct from the networked system 102. The guest issue detection module 142, the host issue detection module 142, the scanning module 152, and the alert generation module 144, can each be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components access one or more database(s) 126 via the database server(s) 124.

Figure 2:
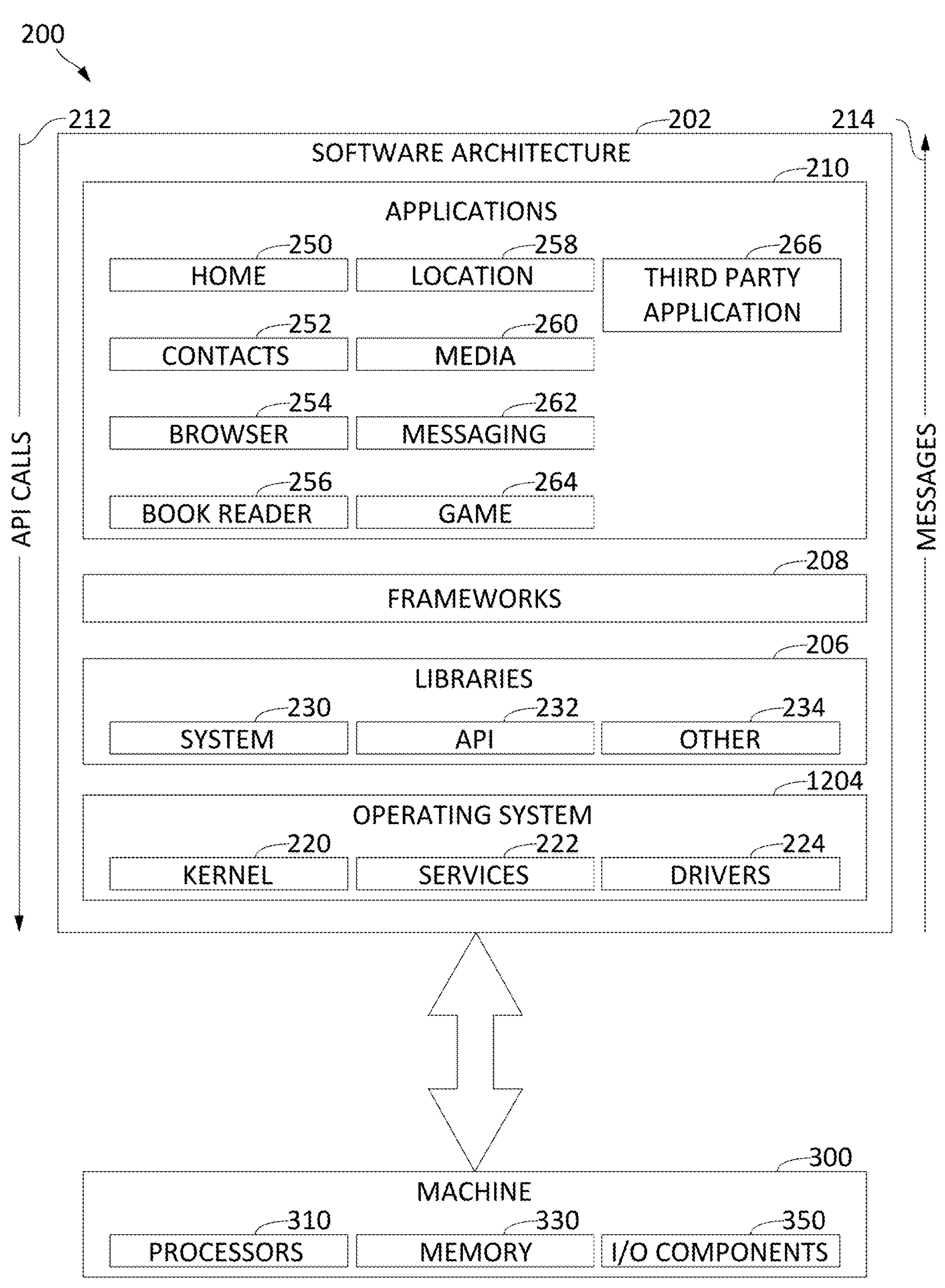
FIG. 2 is a block diagram illustrating the architecture of software used to implement the issue detection system, according to some embodiments.

FIG. 2 is a block diagram 200 illustrating an architecture of software 202, which can be installed on any one or more of the devices described above. FIG. 2 is merely a non-limiting example of a software architecture, and it will be appreciated that many other architectures can be implemented to facilitate the functionality described herein. In various embodiments, software 202 is implemented by hardware such as a machine 300 (further described in FIG. 3) that includes processors 310, memory 330, and input/output (I/O) components 350. In this example architecture, the software 202 can be conceptualized as a stack of layers where each layer may provide a particular functionality. For example, the software 202 includes layers such as an operating system 204, libraries 206, frameworks 208, and applications 210. Operationally, the applications 210 invoke API calls 212 through the software stack and receive messages 214 in response to the API calls 212, consistent with some embodiments.

In various implementations, the operating system 204 manages hardware resources and provides common services. The operating system 204 includes, for example, a kernel 220, services 222, and drivers 224. The kernel 120 acts as an abstraction layer between the hardware and the other software layers, consistent with some embodiments. For example, the kernel 220 provides memory management, processor management (e.g., scheduling), component management, networking, and security settings, among other functionalities. The services 222 can provide other common services for the other software layers. The drivers 224 are responsible for controlling or interfacing with the underlying hardware, according to some embodiments. For instance, the drivers 224 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 206 provide a low-level common infrastructure utilized by the applications 210. The libraries 206 can include system libraries 230 (e.g., C standard library) that can provide functions such as memory allocation functions, string manipulation functions, mathematic functions, and the like. In addition, the libraries 206 can include API libraries 232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 206 can also include a wide variety of other libraries 234 to provide many other APIs to the applications 210.

The frameworks 208 provide a high-level common infrastructure that can be utilized by the applications 210, according to some embodiments. For example, the frameworks 208 provide various graphic user interface (GUI) functions, high-level resource management, high-level location services, and so forth. The frameworks 208 can provide a broad spectrum of other APIs that can be utilized by the applications 210, some of which may be specific to a particular operating system or platform.

In some embodiments, the applications 210 include a home application 250, a contacts application 252, a browser application 254, a book reader application 256, a location application 258, a media application 260, a messaging application 262, a game application 264, and/or a broad assortment of other applications, such as a third-party application 266. According to some embodiments, the applications 210 are programs that execute functions defined in the programs. Various programming languages can be employed to create one or more of the applications 210, structured in a variety of manners, such as object-oriented programming languages (e.g., Objective-C, Java, or C++) or procedural programming languages (e.g., C or assembly language). In a specific example, the third-party application 266 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 266 can invoke the API calls 212 provided by the operating system 204 to facilitate the functionality described herein.

Figure 3:
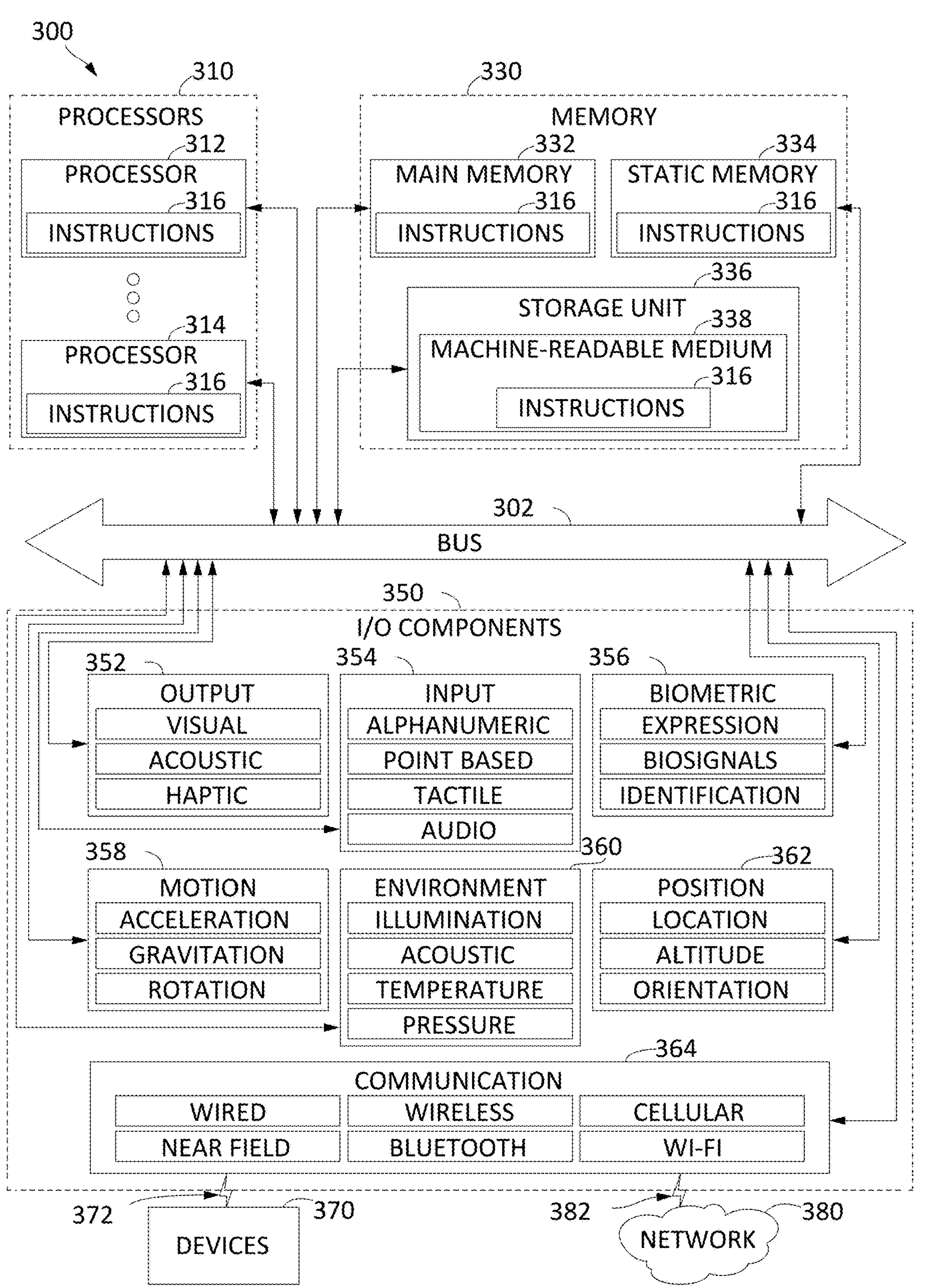
FIG. 3 shows a machine as an example computer system with instructions to cause the machine to implement the issue detection system, according to some embodiments.

FIG. 3 illustrates a diagrammatic representation of a machine 300 in the form of a computer system within which a set of instructions may be executed for causing the machine to perform any one or more of the methodologies discussed herein, according to some embodiments. Specifically, FIG. 3 shows a diagrammatic representation of the machine 300 in the example form of a computer system, within which instructions 316 (e.g., software, a program, an application, an applet, an app, or other executable code) for causing the machine 300 to perform any one or more of the methodologies discussed herein may be executed. The instructions 316 transform the general, non-programmed machine 300 into a particular machine 300 programmed to carry out the described and illustrated functions in the manner described. In alternative embodiments, the machine 300 operates as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment. The machine 300 may comprise, but not be limited to, a server computer, a client computer, a PC, a tablet computer, a laptop computer, a netbook, an STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 316, sequentially or otherwise, that specify actions to be taken by the machine 300. Further, while only a single machine 300 is illustrated, the term "machine" shall also be taken to include a collection of machines 300 that individually or jointly execute the instructions 316 to perform any one or more of the methodologies discussed herein.

The machine 300 may include processors 310, memory 330, and I/O components 350, which may be configured to communicate with each other such as via a bus 302. In some embodiments, the processors 310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 312 and a processor 314 that may execute the instructions 316. The term "processor" is intended to include multi-core processors that may comprise two or more independent processors (sometimes referred to as "cores") that may execute instructions contemporaneously. Although FIG. 3 shows multiple processors 310, the machine 300 may include a single processor with a single core, a single processor with multiple cores (e.g., a multi-core processor), multiple processors with a single core, multiple processors with multiples cores, or any combination thereof.

The memory 330 may include a main memory 332, a static memory 334, and a storage unit 336, all accessible to the processors 310 such as via the bus 302. The main memory 332, the static memory 334, and storage unit 336 store the instructions 316 embodying any one or more of the methodologies or functions described herein. The instructions 316 may also reside, completely or partially, within the main memory 332, within the static memory 334, within the storage unit 336, within at least one of the processors 310 (e.g., within the processor's cache memory), or any suitable combination thereof, during execution thereof by the machine 300.

The I/O components 350 may include a wide variety of components to receive input, provide output, produce output, transmit information, exchange information, capture measurements, and so on. The specific I/O components 350 that are included in a particular machine will depend on the type of machine. For example, portable machines such as mobile phones will likely include a touch input device or other such input mechanisms, while a headless server machine will likely not include such a touch input device. It will be appreciated that the I/O components 350 may include many other components that are not shown in FIG. 3. The I/O components 350 are grouped according to functionality merely for simplifying the following discussion and the grouping is in no way limiting. In various embodiments, the I/O components 350 may include output components 352 and input components 354. The output components 352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some embodiments, the I/O components 350 may include biometric components 356, motion components 358, environmental components 360, or position components 362, among a wide array of other components. For example, the biometric components 356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 358 may include acceleration sensor components (e.g., accelerometer), gravitation sensor components, rotation sensor components (e.g., gyroscope), and so forth. The environmental components 360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 362 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 350 may include communication components 364 operable to couple the machine 300 to a network 380 or devices 370 via a coupling 382 and a coupling 372, respectively. For example, the communication components 364 may include a network interface component or another suitable device to interface with the network 380. In further examples, the communication components 364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 370 may be another machine or any of a wide variety of peripheral devices (e.g., a peripheral device coupled via a USB).

Moreover, the communication components 364 may detect identifiers or include components operable to detect identifiers. For example, the communication components 364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 364, such as location via Internet Protocol (IP) geolocation, location via Wi-Fi® signal triangulation, location via detecting an NFC beacon signal that may indicate a particular location, and so forth.

The various memories (i.e., 330, 332, 334, and/or memory of the processor(s) 310) and/or storage unit 336 may store one or more sets of instructions and data structures (e.g., software) embodying or utilized by any one or more of the methodologies or functions described herein. These instructions (e.g., the instructions 316), when executed by processor(s) 310, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various embodiments, one or more portions of the network 380 may be an ad hoc network, an intranet, an extranet, a VPN, an LAN, a WLAN, a WAN, a WWAN, an MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 380 or a portion of the network 380 may include a wireless or cellular network, and the coupling 382 may be a Code Division Multiple Access (CDMA) connection, a Global System for Mobile communications (GSM) connection, or another type of cellular or wireless coupling. In this example, the coupling 382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 316 may be transmitted or received over the network 380 using a transmission medium via a network interface device (e.g., a network interface component included in the communication components 364) and utilizing any one of a number of well-known transfer protocols (e.g., hypertext transfer protocol (HTTP)). Similarly, the instructions 316 may be transmitted or received using a transmission medium via the coupling 372 (e.g., a peer-to-peer coupling) to the devices 370. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 316 for execution by the machine 300, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Figure 4:
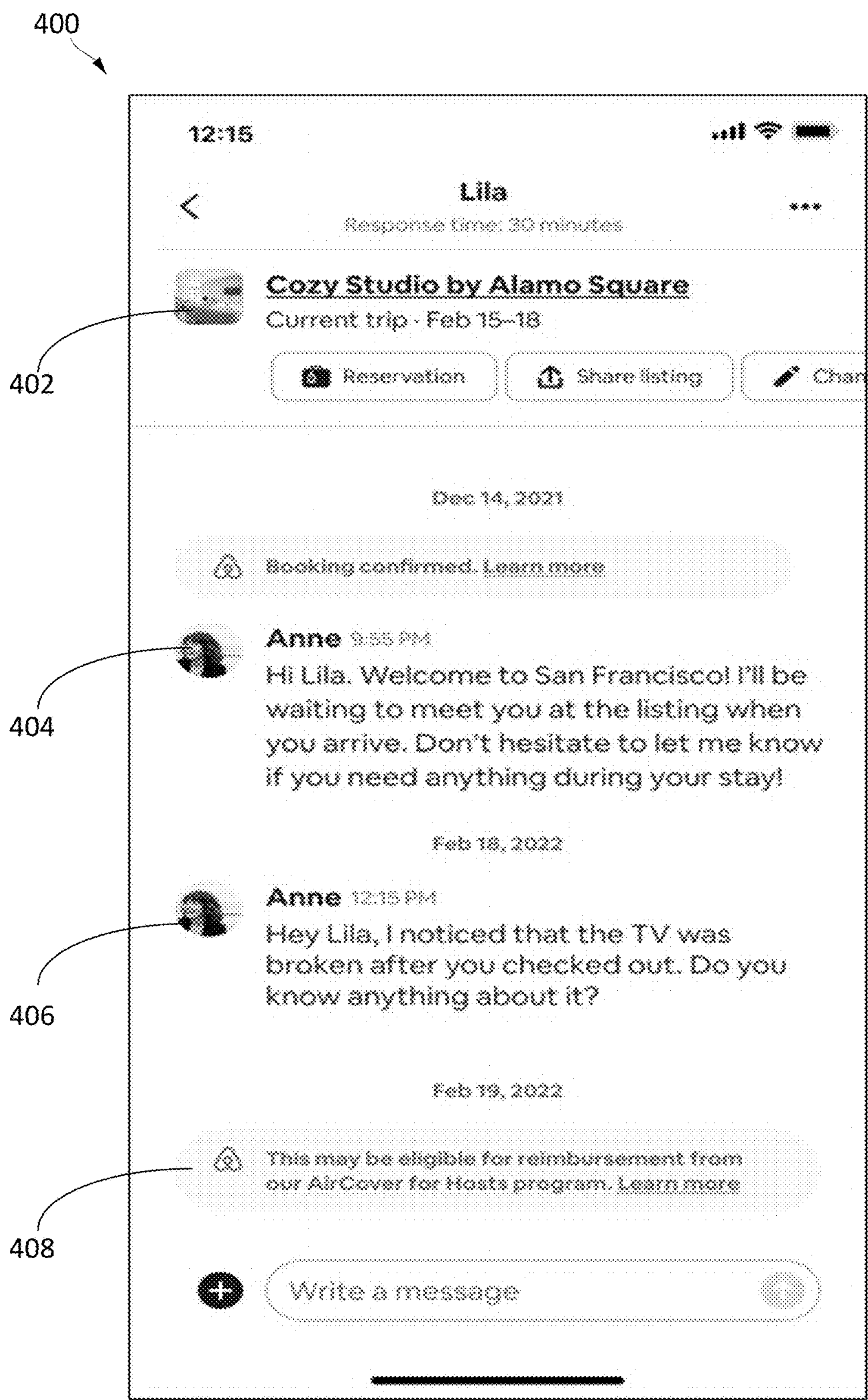
FIG. 4 illustrates an example user interface for responding to an issue, according to some embodiments.

FIG. 4 illustrates an example user interface 400 (e.g., a mobile application user interface, a web browser user interface) for responding to an issue, according to some embodiments. As illustrated, the user interface 400 shows a host perspective of a conversational messaging interface. In this example, a host is shown a notification 402 of a booking/reservation. After the booking is confirmed, the host may send a message 404 to welcome the guest, which is displayed to the host. Subsequently, the host may notice (offline) that there was an issue (in this case a missing item, e.g., a television remote) and send another message 406 to the guest. Based on this message, the system described herein may automatically generate a message 408 to alert the host that they may be eligible for reimbursement. Moreover, such messages may be displayed only to the host. In some embodiments, the system may provide an appropriate alert or message, and/or alert any third parties. The alert or message may be based on previous messages received from the host or the guest, in response to a prior message from the other party. For example, suppose the host had previously responded to a question from a guest on where a TV remote is, the previous response from the host may be used to respond to a new guest's query on the same subject. A guest or a host may also set predefined responses to be provided to a predetermined set of questions. The system may automatically use predefined responses when responding to questions. Although the example in FIG. 4 shows a host perspective, similar corresponding views may be generated from a guest perspective. For example, depending on what a guest says or messages, an appropriate alert may be generated that may be displayed only for the guest. For example, a guest reporting a domestic violence may be prompted to connect with a law enforcement before contacting a host.

A host may send guest messages about a property missing in their private message thread. In some embodiments, when the system detects a high probability that the host is likely to file a host protection request, the system may send the host a message to learn more about reimbursement options for hosts. A similar message may be provided for guests when there are options for the guests based on guest messages for the host. Some embodiments may use context in addition to messages in a message thread for predicting a probability for issues (e.g., property missing). For example, additional logic may determine if a claim has been filed before, if a message was sent previously in a same message thread, if the user is in a predetermined booking stage, if a user is eligible for reimbursement, etc. In some embodiments, a threshold probability for triggering alerts and/or messages may be based on evaluation of precision and recall. Some embodiments identify claim intent in message threads between guest and hosts and provide pointers, suggestions and/or tools for filing a claim.

Some embodiments use one or more models to detect claim intent. Some embodiments monitor and/or continuously improve the one or more models for accuracy, by click rates. In some embodiments, the one or more models may be integrated into an issue detection service 512 for use by upstream services.

Some embodiments intercept guest-host thread to help a host get help with filing a claim faster when the system detects predetermined intends from host messages. In some embodiments, when a host clicks on a user link for reimbursements, the system responds with one or more links to help center and/or articles. Some embodiments provide an issue detection service dashboard for tracking issues. Some embodiments provide per-product data metrics for online monitoring and logging for offline analysis. In order to detect claim intent from a private message in a scalable and precise way, some embodiments use one or more machine learning models.

Figure 5A:
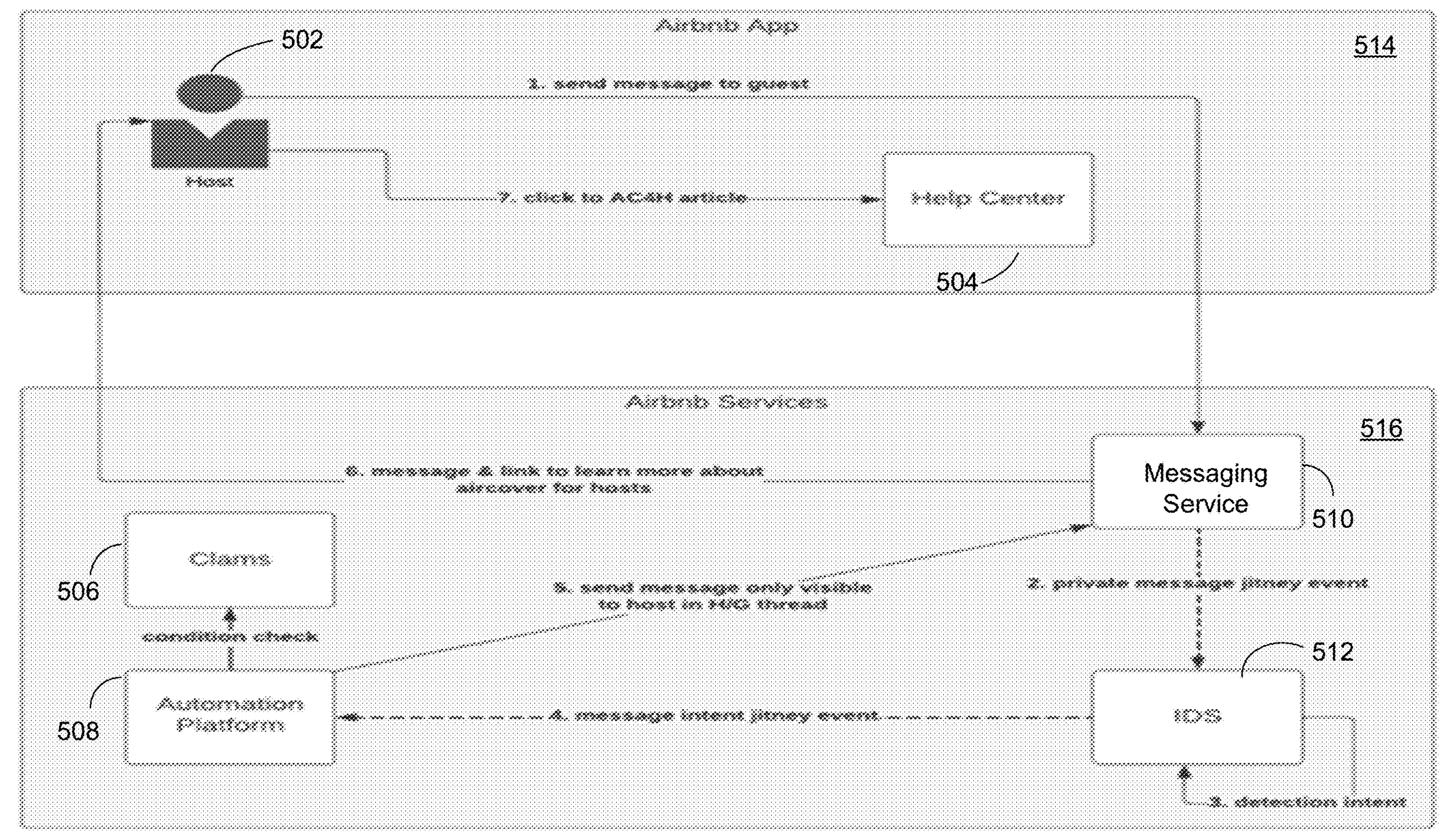
FIG. 5A shows a block diagram of an example system for claim detection, according to some embodiments.

FIG. 5A shows a block diagram of an example system 500 for claim detection, according to some embodiments. A host 502 using an application 514 (e.g., the client application 114) may send (1) a message, as part of a host-guest thread, to a guest via a messaging service 510 as part of a services platform 516. The messaging service 510 may transmit (2) a private message event to an issue detection service 512 for the message. For example, the messaging service 510 may include a listener that obtains and/or listens to messages in message threads. The messaging service 510 may transmit the private message event if it detects the message in the host-guest thread. The issue detection service 512 may detect (3) intent in the message and transmit (4) a message intent event to an automation platform 508. A service in module 506 may handle the reporting and processing of issues that may arise from a reservation on the platform. This includes, but is not limited to, types of issues a traveler or a host may encounter, such as issues with the property, missing amenities, cleanliness issues, and/or issues with the guests. When one of these events occur, the service may provide a way for users to quickly and easily document the issue, engage the appropriate party to remediate the issue, and provide updates to the claim to reach an appropriate resolution. The automation platform may check conditions for triggering claims with a module 506. Subsequently, the automation platform 508 may generate and send (5) a message that is only visible to the host in the host-guest thread. The messaging service 510 may then generate a message and/or a link to reimbursements and/or articles and transmit (6) the same to the host 502. The host 502 may then use or click the link to the articles to communicate with a help center 504. This example is illustrated and described from a host point of view. Similar messaging, intercepts and/or alerts and related mechanisms may be implemented for the guest for the host-guest thread.

In some embodiments, the application 514 may be implemented as part of the client application 114. The help center 504 may be a stand-alone external system that is communicatively coupled with, or implemented as part of the application server 140. The services platform 516 may be implemented as part of the application server 140, according to some embodiments. The messaging service 510 may be implemented as part of the alert generation module 144. The issue detection service 512 may be implemented using the guest issue detection module 150, the host issue detection module 142, and/or the scanning module 152. The automation platform 508 may be implemented as part of the application server 140.

Some embodiments use an asynchronous intent detection mechanism as part of the issue detection service 512. In some embodiments, a claims service listens to a claim intent event, if intent is detected, to generate a host message and send it to a host/guest private message thread that is visible only to the host.

Figure 5B:
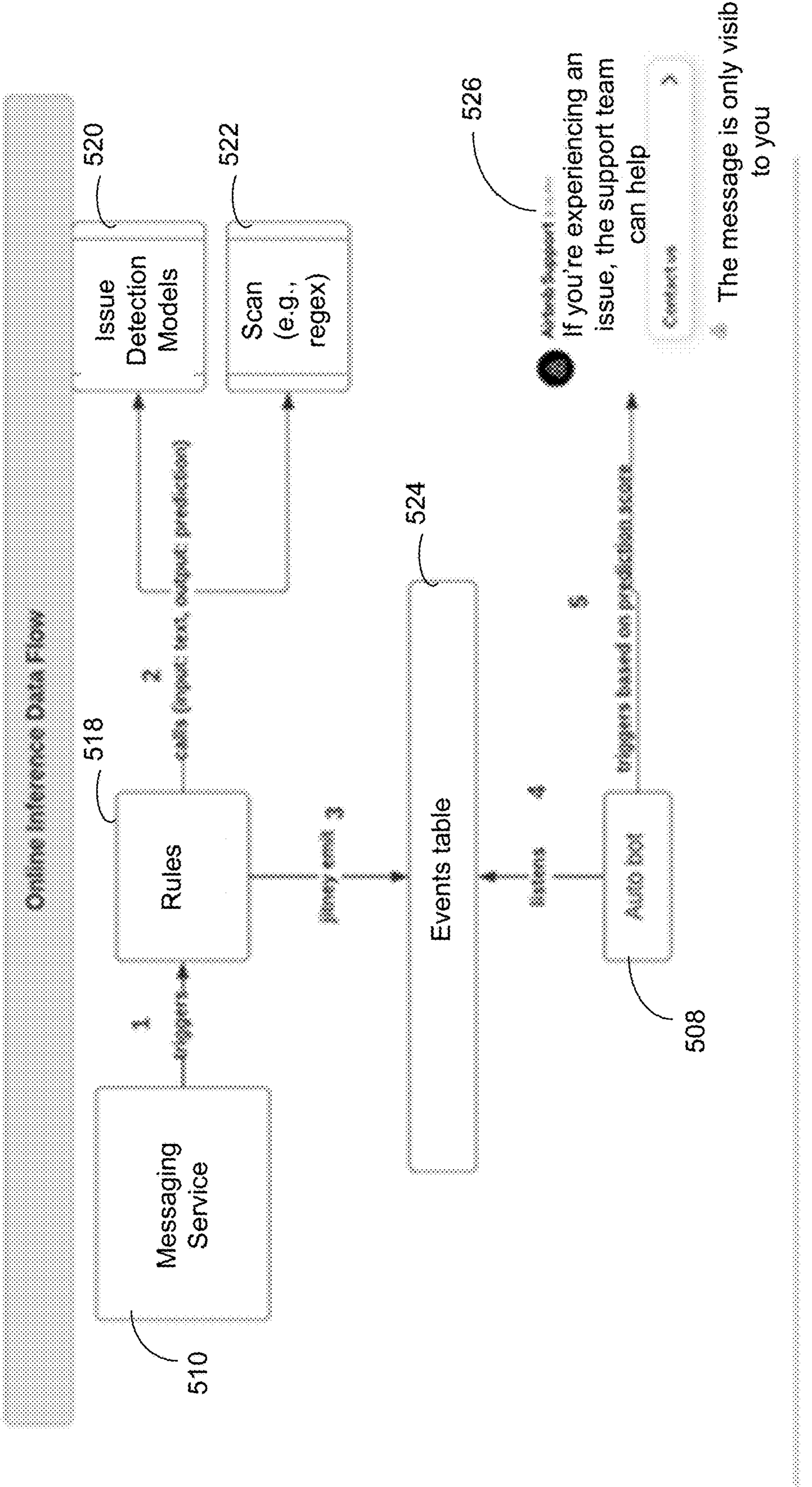
FIG. 5B shows a diagram of an example process for detecting issues, according to some embodiments.

FIG. 5B shows a diagram of an example process 528 for detecting issues, according to some embodiments. Guests and hosts may send messages to each other using a messaging service 510 (sometimes referred to as a data service). The messaging data (sometimes referred to as message threads) may be maintained or stored in the data service. Another service 518 (e.g., a module that is a part of the scanning module 152) may set the rules to determine whether and how a message should be scanned. For example, the rules may include a user role (e.g., if a message is from a guest, a list of responsible host(s), or vice versa), a reservation type (e.g., a booking of a home), and/or a reservation stage (e.g., on trip or during a trip, a rule that reservation check in local time is less than current time that is less than check out local time).

For each message (e.g., an on-trip message that is 24 hours before check-in to 24 hours after check-out), the messaging service 510 may trigger (1) the service 518 to call (2) issue models 520 (e.g., models of the guest issue detection module 150 and the host issue detection module 142) and a keyword detection or scanning 522 (e.g., keyword regular expression, sometimes referred to as regex). Keyword detection or scanning 522 may be explainable but not scalable, and may return false positives. On the other hand, the issue models 520 may be more scalable and may have better performance in terms of precision and recall, but the issue models 520 may not be explainable. The techniques described herein are especially useful in applications that need high precision and explainability. Accordingly, some implementations combine the issue models 520 and the keyword detection or scanning 522 by requiring that both the issue models 520 and the keyword detection or scanning 522 satisfy a threshold or a condition for an issue. In some applications that require high recall, some implementations combine the issue models 520 and the keyword detection 522 by requiring that only one of them satisfy a threshold or a condition. As previously described, the two models may have different purposes. The model for the guest issue detection module 150 detects issues for guests, while the model for the host issue detection module 142 detects issues for hosts. Their training data are different and the messages used for inferences are different. The guest issue detection model is trained on guest-to-host messages, and uses guest-to-host messages to detect issues for guests. The host issue detection model is trained on host-to-guest messages, and it uses host-to-guest messages to detect issues for hosts. The issue detection models may be binary text classification machine learning models. The input of the models may be on-trip private messages sent by guests (or hosts). The output (e.g., model score) for the models may be the probability that guests (or hosts) have any issues. Some embodiments use thresholds (e.g., 0.9) to determine whether the users have issues or not. Some embodiments use keywords for guest or issue detection. Some embodiments use keywords (e.g., 186 English issue keywords) determined by a taxonomist. Non-English issue keywords may be used. Such keywords may be determined by taxonomists. For example, the keyword list may include 347 French issue keywords, 322 Portuguese issue keywords, 308 Japanese issue keywords, 345 German issue keywords, and/or 408 Spanish issue keywords. The models and/or the keyword scanning modules may be trained and/or may include rules specifically for each language.

The guest-host private messages, issue model prediction scores and keyword matching results may be stored (3) in an events table 524 (e.g., a table in the application server 140, a table in the database 126). Results from keyword matching may also be stored in a column of the table. For example, if a message does not contain any keyword in the list, then the column may be NULL; otherwise, the column may be a long string containing the regular expression string. An auto bot (e.g., the automation platform 508) listens (5) to updates in the events table 524. If a model's threshold is breached and/or one of the keywords is matched, then the auto bot may insert (5) a card 526 (sometimes referred to as generating an alert) in a message thread. For example, the alert may display "If you're experiencing an issue, a support team is standing by to help." Some embodiments may provide a button for guests to contact agents or dial services. In some embodiments, the auto bot may not store any data. The auto bot may listen and call another service. The support process or operations (e.g., human agents) may respond to a dispatch (e.g., a dispatch to an urgent support rebooking team, an investigative case team).

Figure 5C:
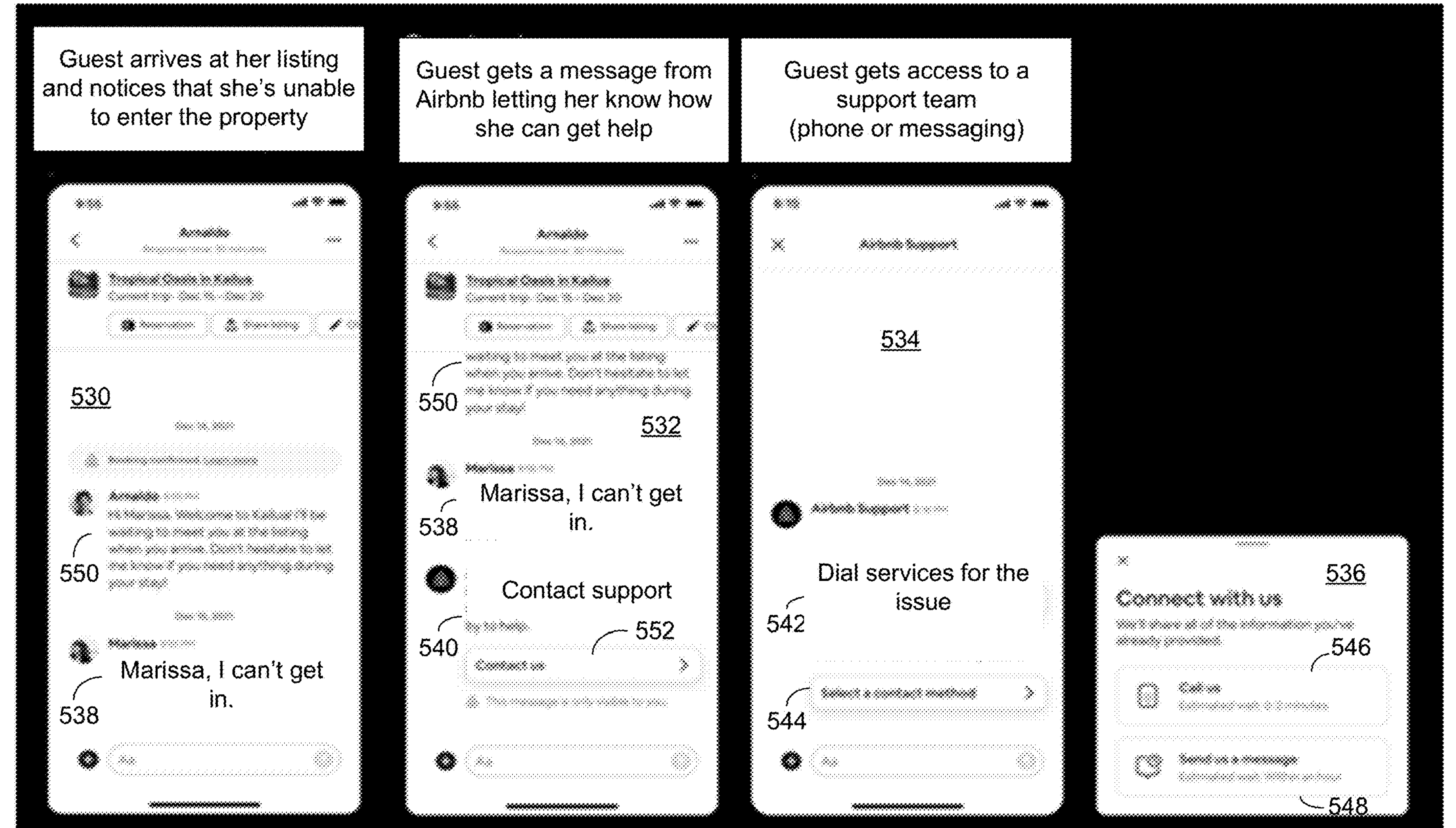
FIG. 5C illustrates example user interfaces for an issue detection flow on a message thread, according to some embodiments.

FIG. 5C illustrates example user interfaces for an issue detection flow on a message thread, according to some embodiments. When a guest arrives at a listing, a host may send a welcome message 550 as shown in interface 530. Suppose the guest notices an issue, they may send a message 538 to the host indicating the issue. The guest may receive an alert message 540 letting the guest know that the guest can receive help, as shown in interface 532. The example also shows an affordance 552 (e.g., a button) for contacting customer support. Suppose the guest selects (or clicks) the affordance 552, an interface 534 may show an affordance 542 for dialing services 542 and another affordance 544 for selecting a contact method. Suppose the guest selects the option 544, another interface 336 that provides an option 546 for calling customer message and another option 548 for sending a message. Although the description herein refers to different interfaces, a same interface may be refreshed to show additional messages or alerts.

Figure 5D:
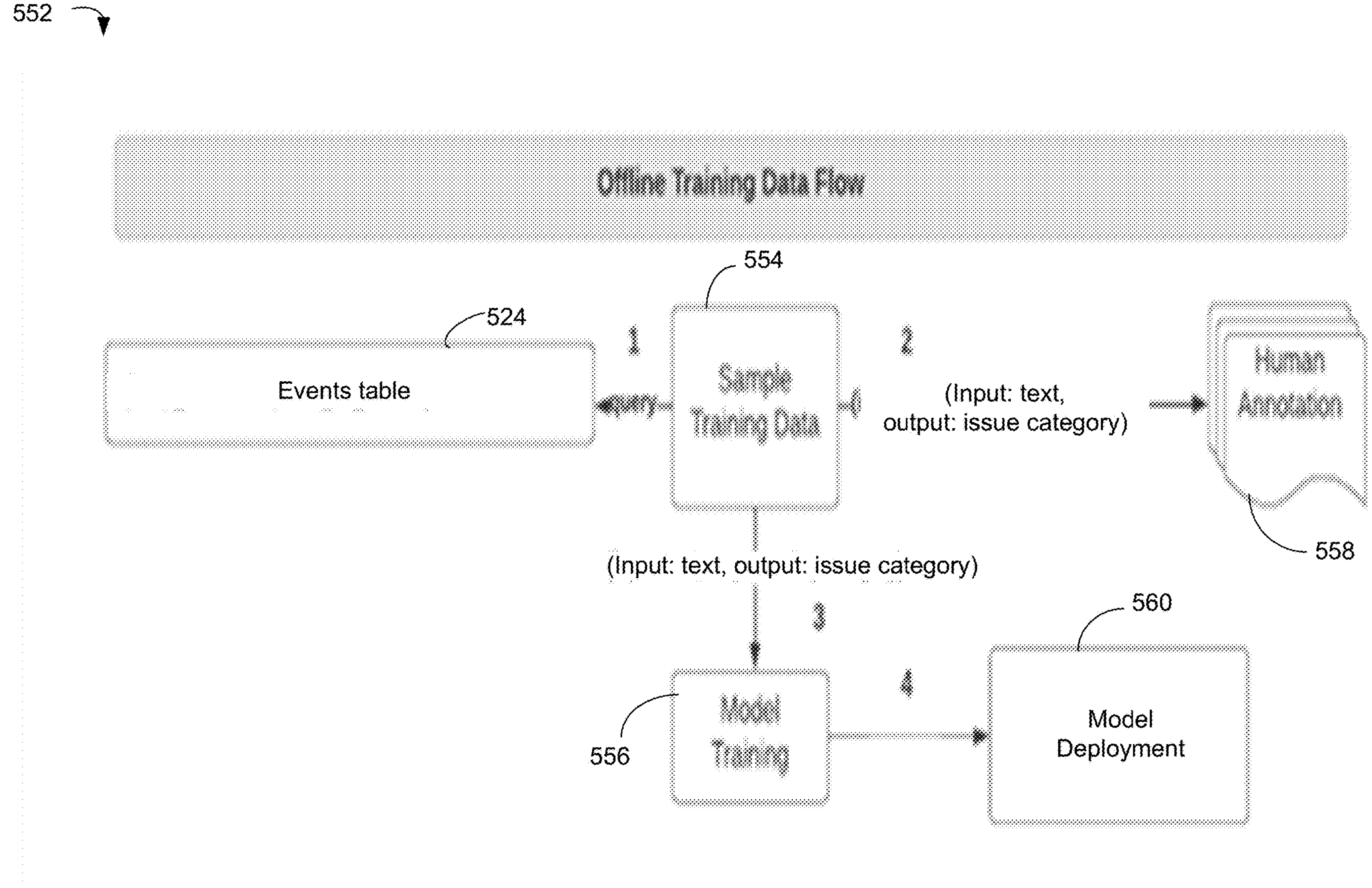
FIG. 5D shows a diagram for an example process for training models, according to some embodiments.

FIG. 5D shows a diagram for an example process 552 for training models, according to some embodiments. To generate training data 554, a sample of guest-to-host messages (e.g., 10,000 messages with issue keywords) may be used. For example, a sample of events from the events table 524 may be queried (1). Some embodiments use keywords determined by one or more taxonomists. For each keyword, a sample up to a predetermined number of messages (e.g., 100 messages) containing the keyword may be used. For example, 10,000 English messages with predetermined high issue detection model probability may be used. Example private English messages with a question mark from on-trip messages between guests and hosts may be used. Some embodiments use messages with a probability higher than 0.9. Some embodiments send (2) sampled data to a team 558 for labeling to determine whether the guests have any issue and need help. A labeling guideline may be provided. For example, there may be a predetermined number of issues. For each message sent by a guest or a host, an annotator is asked to determine if the guest or the host has a sign of one of the issues and needs help and also selects the individual issue (or issues). Based on the labeling team response, training data is generated (3) and the models 556, examples of which are described above may be trained. To train a binary classification model, some embodiments refer to the messages that are labeled as one of the issues as samples (positives), and refer to the messages that are labeled as not issue, not need help, or not enough clear information to determine as non-issue samples (negatives). To ensure the labeling quality, each message may be labeled by three different annotators. If the majority of the annotators (i.e., at least two) label the message as a positive, then some embodiments refer to it as a positive. Subsequently, the trained model 556 is deployed (4) in an endpoint 560 (e.g., as one of the models in the guest issue detection module 150 or the host issue detection module 142). Models may be trained separately for each language. The scanning module may include specific rules for each language. Different languages may have different thresholds (e.g., 0.95 for Spanish, 0.95 for French, 0.2 for German, 0.9 for Portuguese, 0.3 for Japanese).

Figure 6:
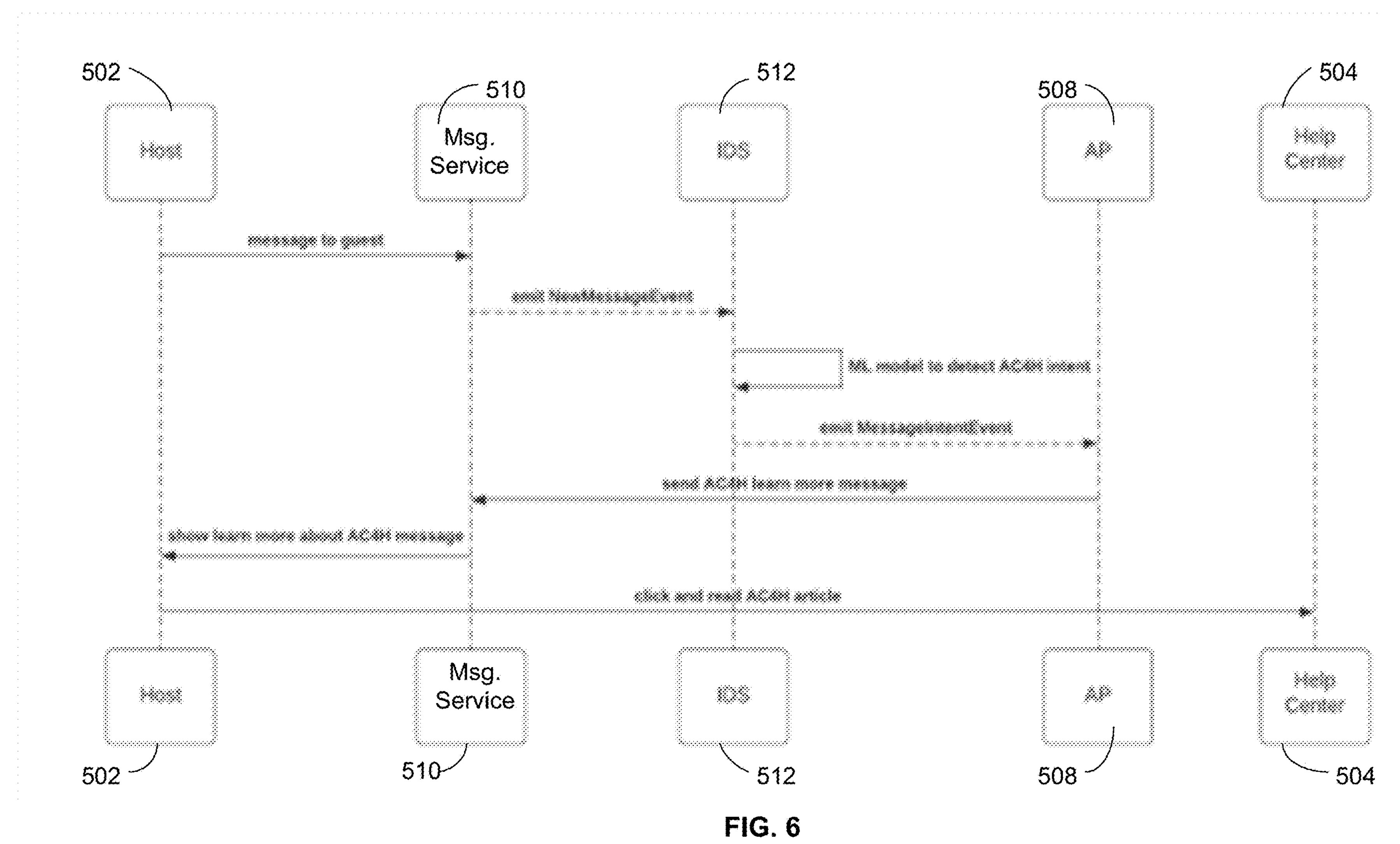
FIG. 6 shows a sequence diagram for an example process for issue detection based on the example architecture shown and described in reference to FIGS. 5A-5D, according to some embodiments.

FIG. 6 shows a sequence diagram for an example process 600 for claim detection based on the example architecture shown and described above in reference to FIGS. 5A-5D, according to some embodiments. Claim detection may include issue detection. The host 502 may transmit a message to a guest. In response, the messaging service 510 may emit a new message event to the issue detection service 512, which in turn uses a machine learning model to detect an intent (e.g., an intent to file claims, an issue-related incident). The issue detection service 512 may also emit a message intent event to the automation platform 508 which may generate and transmit a learn more message to the messaging service 510. The messaging service 510 may forward the learn more message to the host 502. The host 502 may then click and/or read any article in the learn more message and communicate with the help center 504, for further assistance.

In some embodiments, the issue detection service 512 uses one or more machine learning models (e.g., a model of the guest issue detection module 150, a model of the host issue detection module 142) for detecting claim intent in host to guest private messages. The issue detection service 512 may also generate "new message events" from the messaging platform and emit message intent events. The automation platform may generate and transmit reimbursements related information, generate and transmit message intent event consumer, generate and transmit message intent event handler in an event orchestrator, generate and transmit a should send reimbursements for hosts article action in an action store.

In some embodiments, for transmitting message to the host, the module 506 may also act as a reactor to the message intent event and orchestrate to send the message. The module 506 may add a new consumer and a message handler to listen to message intent events. When a new host protection claim classifier result in the message intent event meets a predetermined threshold, an intercept message may be constructed and sent to the host-guest thread visible only to the host. Having the module 506 to react on the message intent event is likely faster than using the automation platform. In the automation platform 508, messages to send may be configured as workflow using a flow builder. Hence, user interface can be evolved by non-engineering product team via a user friendly user interface. The automation platform 508 may support other types of specific actions and may trigger other workflows seamlessly. In some embodiments, the message detection may be extended, and the automation platform 508 may provide other customer support scenarios. In some implementations, claim processing may be integrated within the automation platform 508.

Some embodiments use a Bayesian inference framework for building an issue record, to improve prediction coverage and accuracy. The framework may maintain and/or update users' prior states of issues, based on new evidence to improve issue prediction performance. Some embodiments allow null state issue prediction. Some embodiments provide a centralized model management for issue prediction service for customer support. In some embodiments, the issue detection service 512 may operate as a customer support front desk to provide a single source of truth for issue detection to ensure consistent user experience. Some embodiments provide a unified API for issue detection for all clients (e.g., contract reason and intelligent resolution prediction). Some embodiments support both synchronous issue detection requests (service requests) and asynchronous issue detection requests (event-based triggering).

Bayesian inference techniques may be used to specify how beliefs should be updated based on observed data. Whenever a new observation or evidence comes in, Bayesian inference framework may help update belief not only based on evidence, but also based on prior beliefs. Posterior probability may include prior probability and new evidence (sometimes referred to as likelihood).

Some embodiments detect customers' issues through various channels, such as live chat, bot chat, phone call, message between guest host, agent notes, help center, etc. User/agent actions may be considered as observations or evidence for issue detection. Issue detection models may calculate likelihood or probability of an issue given the new evidence and past beliefs.

Some embodiments detect customer issues solely based on new evidence. This may cause inconsistent user experience and less accurate predictions when evidence is not strong (e.g., a user says 'hello' in a message) or when there is lack of evidence (e.g., a user does not say anything in a phone call).

In some embodiments, the issue detection service 512 may use a Bayesian inference framework. In some experiments, within 7 days prior to contacting customer support, 80% of users sent private messages and more than half of the users received help center articles views. In mutual cancellation issue, when a private message model was introduced to detect refund agreement intent in private message channels, the system was able to detect agreement intent and doubled coverage and reduced 20% of the tickets.

Figure 7:
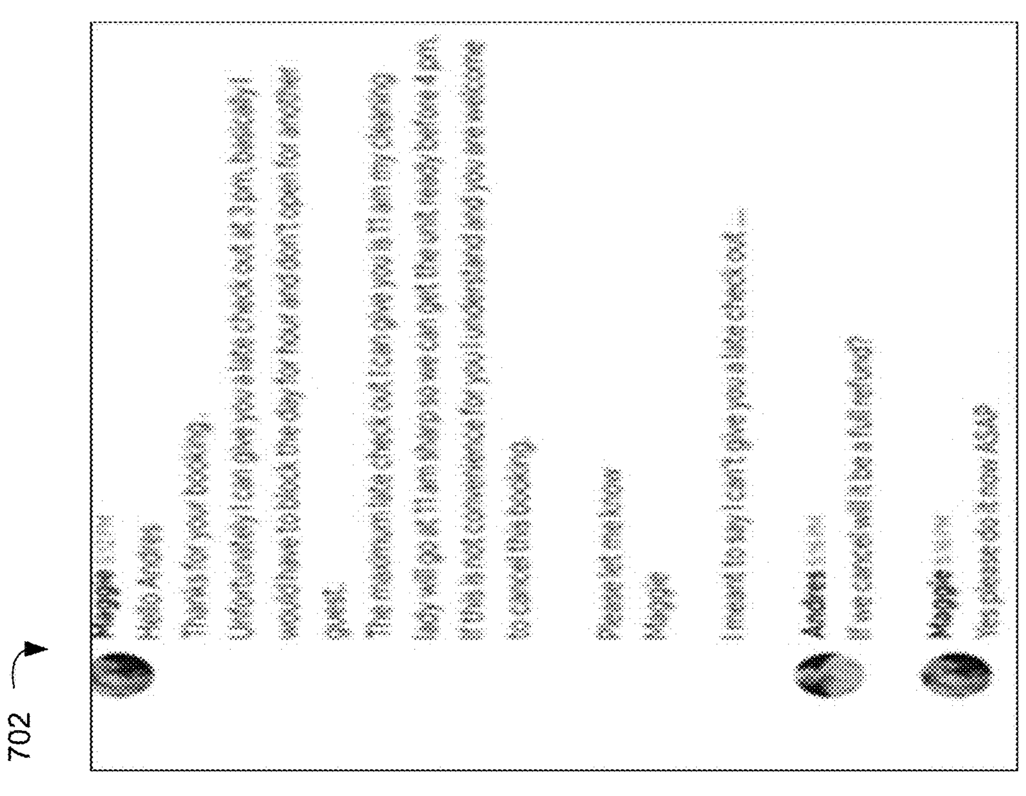
FIG. 7 illustrates example user interfaces for responding to an issue or a user request for a refund, according to some embodiments.
Figure 7:
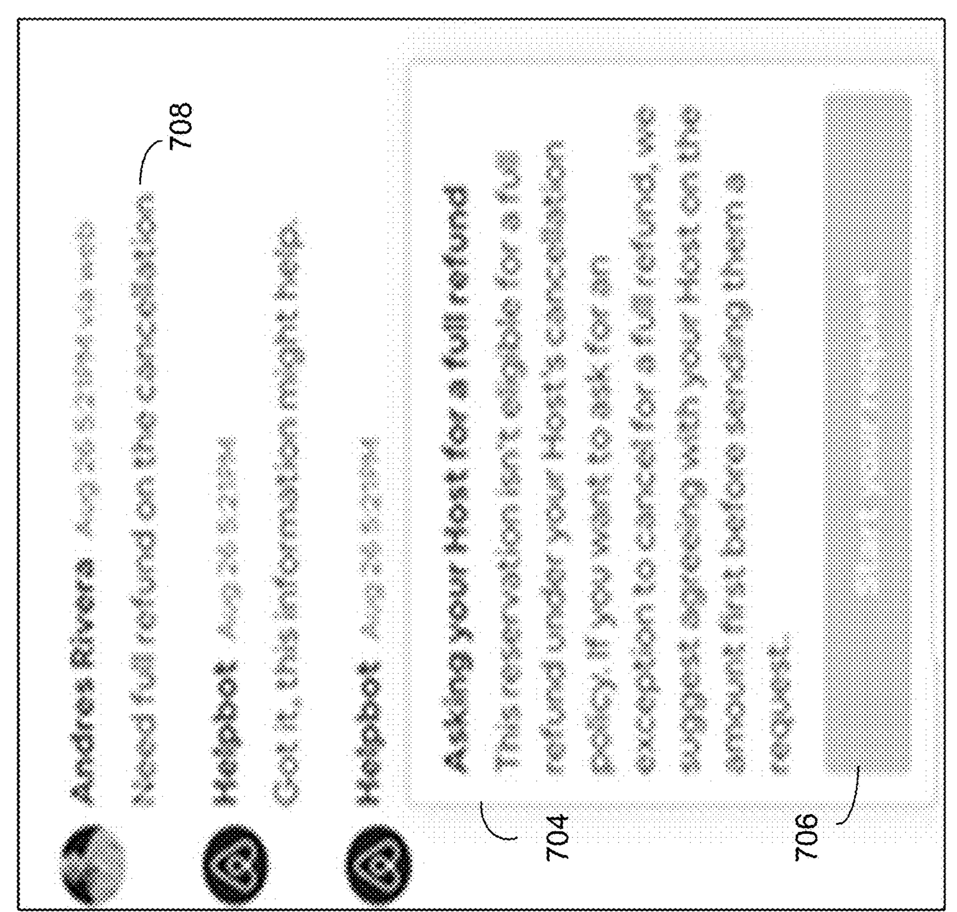

FIG. 7 illustrates example user interfaces (e.g., a mobile application user interface, a web browser user interface) for responding to an issue or a user request for a refund, according to some embodiments. The user interface 700 corresponds to a guest perspective of a conversational messaging interface. In this example, a guest sends a message 708 asking for a refund. The system intercepts the message and automatically generates and displays a message 704 that helps the guest with how to ask a host for the full refund, and provides a clickable link 706 for starting the request. The example user interface 702 shows a conversational messaging interface where the guest and the host are messaging each other for the refund.

FIG. 8 shows a flow diagram of a method (800) for detecting issues in guest-host messages, according to some embodiments. In some embodiments, the steps of the method 800 are performed by a computer (e.g., the application server 140). In some embodiments, the steps of the method 800 are performed by a system (e.g., the networked system 102). In some embodiments, FIG. 8 corresponds to instructions stored in a computer memory or computer-readable storage medium (e.g., memory of the application server 140). The memory stores one or more programs configured for execution by the one or more processors. For example, the operations of the method 800 may be performed, at least in part, by the guest issue detection module 150, the host issue detection module 142, the message scanning module 152, and/or the alert generation module 144. In some embodiments, the steps of the method 800 may be performed by the API server 120, the web server 122, the application server 140, and/or the database server 124.

The method includes providing (802) a conversational messaging interface for guest-host interactions on a messaging platform, such as a platform provided by the system 102. Steps of the method may be performed while a host and a guest are messaging via the conversational messaging interface on the messaging platform. FIG. 7 shows example user interfaces that correspond to a guest perspective (e.g., the interface 700) and a host perspective (e.g., the interface 702) of a conversational messaging interface. The method includes obtaining (804) a message thread for an interaction between the guest and the host. For example, in FIG. 6, the messaging service 510 obtains the message thread. In response to receiving (806) a guest message in the message thread, the message includes computing (808) a first probability for one or more guest issues by inputting a first one or more feature vectors corresponding to the guest message to a guest issue detection model (e.g., a machine learning model of the guest issue detection model 150) that is trained (e.g., as described above in reference to FIG. 5D) to detect issues for guests. In response to receiving (810) a host message in the message thread, the method includes computing (812) a second probability for one or more host issues by inputting a second one or more feature vectors corresponding to the host message to a host issue detection model (e.g., a machine learning model of the host issue detection module 142) that is trained (e.g., as described above in reference to FIG. 5D) to detect issues for hosts that are distinct from the issues for guests. The method also includes scanning (814) messages in the message thread to identify a presence of one or more keywords that is likely to indicate the one or more guest issues or one or more host issues. For example, the scanning module 152 scans messages in the message thread to identify keywords. The method also includes, in accordance with an identification (816) of the presence of the one or more keywords: in accordance with a determination (818) that the first probability for the one or more guest issues is above a guest issue predetermined threshold, providing (820) one or more alerts that is visible only to the guest in the conversational messaging interface. For example, the alert generation module 144 may determine if the first probability for above a predetermined guest issue predetermined threshold (e.g., 0.9), and coordinates with the messaging service 510 to generate the alert that is visible only to the guest. For example, in FIG. 7, the message 704 is shown to the guest, but not the host. The method also includes, in accordance with a determination (822) that the second probability for the one or more host issues is above a host issue predetermined threshold, providing (824) one or more alerts that is visible only to the host in the conversational messaging interface. For example, the alert generation module 144 may determine if the second probability for above a predetermined host issue predetermined threshold (e.g., 0.8), and coordinates with the messaging service 510 to generate the alert that is visible only to the guest.

In some embodiments, scanning the messages in the message thread is performed (e.g., by the scanning module 152) in accordance with the determination that either the first probability is above the guest issue predetermined threshold or the second probability is above the host issue predetermined threshold.

In some embodiments, (i) computing the first probability (e.g., by the guest issue detection module 150) for the one or more guest issues and (ii) computing the second probability (e.g., by the host issue detection module 142) for the one or more host issues, are performed in accordance with an identification of the presence of the one or more keywords.

In some embodiments, the guest issue predetermined threshold is different from the host issue predetermined threshold.

In some embodiments, the guest issue predetermined threshold is same as the host issue predetermined threshold.

In some embodiments, the guest issue violation detection model and the host issue detection model operate concurrently on a same set of feature vectors corresponding to messages from the message thread. For example, the feature vectors are shared between machine learning models of the guest issue detection module 150 and the host issue detection module 142.

In some embodiments, the guest issue detection model and the host issue detection model operate independently on subsets of a same set of feature vectors corresponding to messages from the message thread. For example, the machine learning models of the guest issue detection module 150 and the host issue detection module 142 operate independently on subsets of a same set of feature vectors corresponding to messages from the message thread obtained by the messaging service 510.

In some embodiments, the guest issue detection model and the host issue detection model are dependent on each other's output. For example, the machine learning models of the guest issue detection module 150 and the host issue detection module 142 are dependent on each other's output.

In some embodiments, the guest issue detection model is a pre-trained model that is (i) trained on guest-to-host messages and (ii) uses guest-to-host messages to do its detection; and the host issue detection model is another pre-trained model that is (i) trained on host-to-guest messages and (ii) uses host-to-guest messages to do its detection.

In some embodiments, the guest issue detection model and the host issue detection model are binary text classification machine learning models.

In some embodiments, the method further includes continuously training the guest issue detection model and the host issue detection model using messages from the message thread.

In some embodiments, the one or more keywords include keywords from a plurality of languages.

In some embodiments, (i) the guest issue detection model is trained to detect issues for guests based on a first language and (ii) the host issue detection model is trained to detect issues for hosts based on a second language distinct from the first language.

In some embodiments, the guest issue detection model and the host issue detection model use different thresholds for detecting issues.

It will be understood that, although the terms first, second, etc., are, in some instances, used herein to describe various elements, these elements should not be limited by these terms. These terms are only used to distinguish one element from another. For example, a first widget could be termed a second widget, and, similarly, a second widget could be termed a first widget, without departing from the scope of the various described implementations. The first widget and the second widget are both widgets, but they are not the same condition unless explicitly stated as such.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen to best explain the principles underlying the claims and their practical applications, to thereby enable others skilled in the art to best use the implementations with various modifications as are suited to the particular uses contemplated.

What is claimed is:

1. A method of detecting issues in guest-host messages on a messaging platform, the method comprising:

providing a conversational messaging interface for guest-host interactions on the messaging platform; and while a host and a guest are messaging via the conversational messaging interface on the messaging platform:

obtaining a message thread for an interaction between the guest and the host;

in response to receiving a guest message in the message thread:

computing a first probability for one or more guest issues by inputting a first one or more feature vectors corresponding to the guest message to a guest issue detection model that is trained to detect issues for guests;

in response to receiving a host message in the message thread:

computing a second probability for one or more host issues by inputting a second one or more feature vectors corresponding to the host message to a host issue detection model that is trained to detect issues for hosts that are distinct from the issues for guests;

scanning messages in the message thread to identify a presence of one or more keywords that is likely to indicate the one or more guest issues or one or more host issues; and in accordance with an identification of the presence of the one or more keywords:

in accordance with a determination that the first probability for the one or more guest issues is above a guest issue predetermined threshold, providing one or more alerts that are visible only to the guest in the conversational messaging interface; and in accordance with a determination that the second probability for the one or more host issues is above a host issue predetermined threshold, providing one or more alerts that are visible only to the host in the conversational messaging interface.

2. The method of claim 1, wherein scanning the messages in the message thread is performed in accordance with the determination that either the first probability is above the guest issue predetermined threshold or the second probability is above the host issue predetermined threshold.

3. The method of claim 2, wherein (i) computing the first probability for the one or more guest issues and (ii) computing the second probability for the one or more host issues, are performed in accordance with an identification of the presence of the one or more keywords.

4. The method of claim 3, wherein the guest issue predetermined threshold is different from the host issue predetermined threshold.

5. The method of claim 4, wherein the guest issue predetermined threshold is the same as the host issue predetermined threshold.

6. The method of claim 5, wherein the guest issue detection model and the host issue detection model operate concurrently on a same set of feature vectors corresponding to messages from the message thread.

7. The method of claim 6, wherein the guest issue detection model and the host issue detection model operate independently on subsets of a same set of feature vectors corresponding to messages from the message thread.

8. The method of claim 5, wherein the guest issue detection model and the host issue detection model are dependent on each other's output.

9. The method of claim 5, wherein:

the guest issue detection model is a pre-trained model that (i) is trained on guest-to-host messages and (ii) uses guest-to-host messages to do its detection; and the host issue detection model is another pre-trained model that (i) is trained on host-to-guest messages and (ii) uses host-to-guest messages to do its detection.

10. The method of claim 9, wherein the guest issue detection model and the host issue detection model are binary text classification machine learning models.

11. The method of claim 10, further comprising:

continuously training the guest issue detection model and the host issue detection model using messages from the message thread.

12. The method of claim 11, wherein the one or more keywords include keywords from a plurality of languages.

13. The method of claim 12, wherein (i) the guest issue detection model is trained to detect issues for guests based on a first language and (ii) the host issue detection model is trained to detect issues for hosts based on a second language distinct from the first language.

14. The method of claim 13, wherein the guest issue detection model and the host issue detection model use different thresholds for detecting issues.

15. A system comprising a server including one or more processors and memory storing one or more programs to be executed by the one or more processors, the one or more programs including instructions for: while a host and a guest are messaging via a conversational messaging interface hosted by a messaging platform:

obtaining a message thread for an interaction between the guest and the host;

in response to receiving a guest message in the message thread:

computing a first probability for one or more guest issues by inputting a first one or more feature vectors corresponding to the guest message to a guest issue detection model that is trained to detect issues for guests;

in response to receiving a host message in the message thread:

computing a second probability for one or more host issues by inputting a second one or more feature vectors corresponding to the host message to a host issue detection model that is trained to detect issues for hosts that are distinct from the issues for guests;

scanning messages in the message thread to identify a presence of one or more keywords that is likely to indicate the one or more guest issues or one or more host issues; and in accordance with an identification of the presence of the one or more keywords:

in accordance with a determination that the first probability for the one or more guest issues is above a guest issue predetermined threshold, providing one or more alerts that are visible only to the guest in the conversational messaging interface; and in accordance with a determination that the second probability for the one or more host issues is above a host issue predetermined threshold, providing one or more alerts that are visible only to the host in the conversational messaging interface.

16. The system of claim 15, wherein scanning the messages in the message thread is performed in accordance with the determination that either the first probability is above the guest issue predetermined threshold or the second probability is above the host issue predetermined threshold.

17. The system of claim 16, wherein (i) computing the first probability for the one or more guest issues and (ii) computing the second probability for the one or more host issues, are performed in accordance with an identification of the presence of the one or more keywords.

18. The system of claim 17, wherein the guest issue predetermined threshold is different from the host issue predetermined threshold.

19. The system of claim 18, wherein the guest issue predetermined threshold is the same as the host issue predetermined threshold.

20. A non-transitory computer readable storage medium storing one or more programs configured for execution by a computer system having a display, one or more processors, and memory, the one or more programs comprising instructions for:

while a host and a guest are messaging via a conversational messaging interface hosted by a messaging platform:

obtaining a message thread for an interaction between the guest and the host;

in response to receiving a guest message in the message thread:

computing a first probability for one or more guest issues by inputting a first one or more feature vectors corresponding to the guest message to a guest issue detection model that is trained to detect issues for guests;

in response to receiving a host message in the message thread:

computing a second probability for one or more host issues by inputting a second one or more feature vectors corresponding to the host message to a host issue detection model that is trained to detect issues for hosts that are distinct from the issues for guests;

scanning messages in the message thread to identify a presence of one or more keywords that is likely to indicate the one or more guest issues or one or more host issues; and in accordance with an identification of the presence of the one or more keywords:

in accordance with a determination that the first probability for the one or more guest issues is above a guest issue predetermined threshold, providing one or more alerts that is visible only to the guest in the conversational messaging interface; and in accordance with a determination that the second probability for the one or more host issues is above a host issue predetermined threshold, providing one or more alerts that is visible only to the host in the conversational messaging interface.

* * * * *